United States Patent
Raque et al.

[11] Patent Number: 5,971,020
[45] Date of Patent: Oct. 26, 1999

[54] ROTARY COUPLING FOR AN ARTICLE HANDLER

[75] Inventors: Glen F. Raque; Sherley W. Sample, both of Louisville, Ky.

[73] Assignee: Raque Food Systems, Inc., Louisville, Ky.

[21] Appl. No.: 09/104,609

[22] Filed: Jun. 25, 1998

Related U.S. Application Data

[62] Division of application No. 08/559,295, Nov. 15, 1995, Pat. No. 5,810,049.

[51] Int. Cl.$^6$ .......................... F16K 11/074; F16K 25/00
[52] U.S. Cl. ..................... 137/625.11; 251/175; 251/192
[58] Field of Search ..................... 137/625.11; 251/160, 251/161, 175, 192

[56] References Cited

U.S. PATENT DOCUMENTS

| | | | |
|---|---|---|---|
| 2,079,041 | 5/1937 | Ryan et al. | 137/625.11 |
| 2,741,265 | 4/1956 | Poor | 137/625.11 |
| 2,918,938 | 12/1959 | Kimball | 137/625.11 |
| 3,040,777 | 6/1962 | Carson et al. | 137/625.15 |
| 3,198,004 | 8/1965 | Roberts et al. | 137/625.15 X |
| 3,246,667 | 4/1966 | Pemberton | 137/625.11 X |
| 3,658,092 | 4/1972 | Walker et al. | 137/625.21 |
| 4,490,961 | 1/1985 | Raque | 53/329 |
| 4,509,555 | 4/1985 | Stirbis | 137/625.11 |
| 4,564,043 | 1/1986 | Trittler | 251/175 X |
| 4,632,148 | 12/1986 | Stark, Sr. et al. | 251/175 X |
| 4,700,745 | 10/1987 | Ellis | 137/625.21 X |
| 4,791,775 | 12/1988 | Raque et al. | 53/510 |
| 4,807,424 | 2/1989 | Robinson et al. | 53/432 |
| 5,275,206 | 1/1994 | Acker | 251/175 X |

*Primary Examiner*—John Rivell
*Attorney, Agent, or Firm*—Bose McKinney & Evans

[57] ABSTRACT

A rotary coupling for communicating a pneumatic signal from a stationary pneumatic source to an apparatus. The rotary coupling has a housing and a rotating portion that rotates with respect thereto. The housing has at least two inlets in fluid communication with the pneumatic source. The rotating portion has at least two outlets in fluid communication with the apparatus. Inlet and outlet pairs are aligned radially relative to an axis of rotation of the rotating portion so that they are in fluid communication when the rotating portion is at an angular orientation at which the inlet and outlet pair are coincident. More than one inlet may be paired with an outlet, and vice versa. Channels can be formed to allow the inlet and outlet pairs to be in fluid communication when they are not coincident. Inlets and outlets can also be radially spaced different distances from the axis of rotation such that fluid communication between these inlets and outlets are blocked at all angular orientations of the rotating portion.

2 Claims, 4 Drawing Sheets

ROTARY COUPLING FOR AN ARTICLE HANDLER

This is a division of application Ser. No. 08/559,295 filed Nov. 15, 1995 now U.S. Pat. No. 5,810,049.

BACKGROUND AND SUMMARY OF THE INVENTION

The present invention relates to a coupling connecting an article handler to a source of pneumatic signals, and particularly to a rotary coupling for selectively blocking and restoring fluid communication between a rotating article handler and the stationary pneumatic signal source. More particularly, the present invention relates to a rotary coupling that couples a rotating article handler associated with a heat seal machine to the stationary source of pneumatic signals and that controls the communication of the pneumatic signals therebetween.

Food processing equipment is frequently complex equipment having various translating or rotating moving parts. In addition, food processing equipment can employ pneumatic flow such as vacuum or forced air to either hold an article against an article handler or to separate the article from the article handler. What is needed is a rotary coupling that can couple a stationary source of pneumatic signals to a rotating portion of an article handler to allow fluid communication therebetween. Equipment manufacturers and operators of food processing equipment would appreciate food processing equipment having such a rotary coupling that is capable of communicating pneumatic flow through multiple channels and conduits, that is capable of restricting the communication of the pneumatic flow so that the pneumatic flow is available only during selected portions of the rotation cycle of the article handler, and that is capable of communicating both vacuum and forced air signals.

According to the present invention, a rotary coupling is provided. The rotary coupling controls the communication of pneumatic signals from a stationary pneumatic signal source to an apparatus. The rotary coupling comprises a housing having an inlet in fluid communication with the pneumatic signal source and a rotating portion received in the housing for rotation with respect thereto. The rotating portion has an outlet in fluid communication with the apparatus. The inlet and the outlet are radially aligned relative to an axis of rotation of the rotating portion so that the inlet and the outlet are in fluid communication when the rotating portion is at an angular orientation at which the inlet and the outlet are coincident.

In preferred embodiments, the rotary coupling connects a rotating article handler associated, for example, with a heat seal machine to the source of pneumatic signals. The pneumatic signal source can illustratively include a vacuum source or a source of pressurized air. A rotating shaft, including a conduit in fluid communication with both the article handler and the rotary coupling, rotates the article handler. As the shaft rotates, the rotating article handler alternately lifts articles using suction force when the rotary coupling connects the article handler to the vacuum source and releases the articles when the rotary coupling removes the suction by disconnecting the article handler from the vacuum source and connecting the article handle to the source of pressurized air.

The rotary coupling in accordance with the present invention controls and "programs" the communication of pneumatic signals from the pneumatic signal source to the article handler. The rotary coupling establishes the sequencing of the pneumatic signals as well as the timing and duration of the signals. As the shaft rotates, the coupling selectively blocks and restores fluid communication between the article handler and the pneumatic signal source to communicate the pre-programmed pneumatic signals at each portion of the rotation cycle of the article handler. In addition, the coupling can be readily and easily adjusted to retard or advance the timing of the pneumatic signals. Also, the sequencing of signals can be changed entirely simply by changing a stationary pad inside of the coupling, completely "reprogramming" the sequence of pneumatic signals.

The rotary coupling includes a housing defining a cavity. The housing includes an end cap and the stationary pad which is supported by the end cap inside the cavity in a radially fixed orientation relative to the end cap for slight axial movement relative to the end cap. The stationary pad has an opening extending through the pad that is in fluid communication with an opening in the end cap. The opening in the end cap is in fluid communication with the source of pneumatic signals.

The rotary coupling also includes the shaft having a first end coupled to the rotating article handler of the equipment and a second end having an end portion rotatably received by the housing. The end portion includes a rotating pad supported in the cavity for slight axial movement relative to the shaft but in a radially fixed orientation relative to the shaft. The rotating pad thus rotates relative to the stationary pad.

The stationary pad has a first sealing face that is preferably very finely machined, ground flat, and then lapped to near perfect flatness. Likewise, the rotating pad has a second sealing face that is preferably very finely machined, ground flat, and then lapped to near perfect flatness. The shaft is received in the housing so that the first sealing face sealingly engages the second sealing face.

Sealing engagement of the first and second sealing faces is achieved in part by providing the first and second sealing faces with near perfect flatness as described above. In addition, the stationary and rotating pads are mounted so that the pads axially "float" between the end cap and the end portion of the main shaft. This float is achieved by providing the axially slidable connections between the stationary pad and the end cap and between the rotating pad and the end portion of the main shaft and by yieldably biasing the stationary pad away from the end cap and yieldably biasing the rotating pad away from the end portion of the main shaft so that the stationary and rotating pads are biased toward one another.

The stationary pad is yieldably biased away from the end cap by o-rings made from a resilient material positioned to lie between the stationary pad and the end cap. Likewise, the rotating pad is yieldably biased away from the end portion of the main shaft by o-rings made from a resilient material positioned to lie between the rotating pad and the end portion of the main shaft. These o-rings allow the stationary pad to move sightly in an axial direction relative to the end cap and the rotating pad to move slightly in the axial direction relative to the main shaft. The o-rings also allow the pads to adjust so that pads are not necessarily precisely parallel to the end cap or the end portion of the shaft, thus ensuring the sealing engagement between the sealing faces when opposing faces of the end portion and the end cap are not precisely parallel.

The rotating pad is formed to include an opening that extends through the rotating pad. The opening in the rotating pad is in fluid communication with the article handler through the conduit of the shaft.

The opening in the rotating pad and the opening in the stationary pad are radially aligned so that the openings coincide during a predetermined portion of each rotation cycle of the shaft and the rotating pad relative to the housing and the stationary pad. When the openings in the stationary and rotating pads are coincident, the openings are in fluid communication so that the article handler is in fluid communication with the pneumatic signal source. When the openings in the stationary and rotating pads are not coincident, the sealing engagement between the first and second sealing faces blocks the fluid communication between the openings in the rotating and stationary pads, blocking the fluid communication between the pneumatic signal source and the article handler. Thus, the positioning of the openings in the stationary and rotating pads operates to program the rotary coupling to communicate the pneumatic signal from the pneumatic signal source to the article handler when the article handler is at a predetermined angular orientation.

The rotating and stationary pads can additionally cooperate to define an arcuate channel in fluid communication with the openings in the rotating and stationary pads at selected portions of the rotation cycle. The channel operates to maintain the fluid communication between the openings in the rotating and stationary pads during portions of the rotation cycle at which the openings are not coincident. The channel, in effect, lengthens the portion of the rotation cycle of the shaft during which the openings in the rotating and stationary pads are in fluid communication, thereby lengthening the duration of the communication of the pneumatic signal from the pneumatic signal source to the article handler.

Lengthening the channel lengthens the portion of the rotation cycle during which the openings are in fluid communication. In addition, the channels can be formed so that the openings are not centered within the channel. Instead, the channel can be formed, for example, so that the fluid communication starts earlier in the rotation cycle and ends earlier in the rotation cycle than would occur if the opening was centered in the channel. Likewise, the channel can be formed so that the fluid communication is restored later and is blocked later in the cycle than would occur if the opening were centered in the channel. It can be seen, then, that the channel can be used to alter both the orientation of the shaft at which the openings in the rotating and stationary pads are in fluid communication and the extent of the rotation cycle during which the openings in the rotating and stationary pads are in fluid communication, thus varying the timing and duration of the communication of pneumatic signals between the pneumatic signal source and the article handler.

It is preferred that the channel is formed in the stationary pad, however channels can be formed in both the stationary and rotating pads or in only the rotating pad without altering the scope of the invention as presently perceived. It can be seen that if the channel is formed on the stationary pad, for example, the sequencing and duration of the communication of pneumatic signals between the article handler and the pneumatic signal source can be easily changed by replacing the stationary pad with a different stationary pad having a channel with a different configuration than the channel on the replaced stationary pad.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
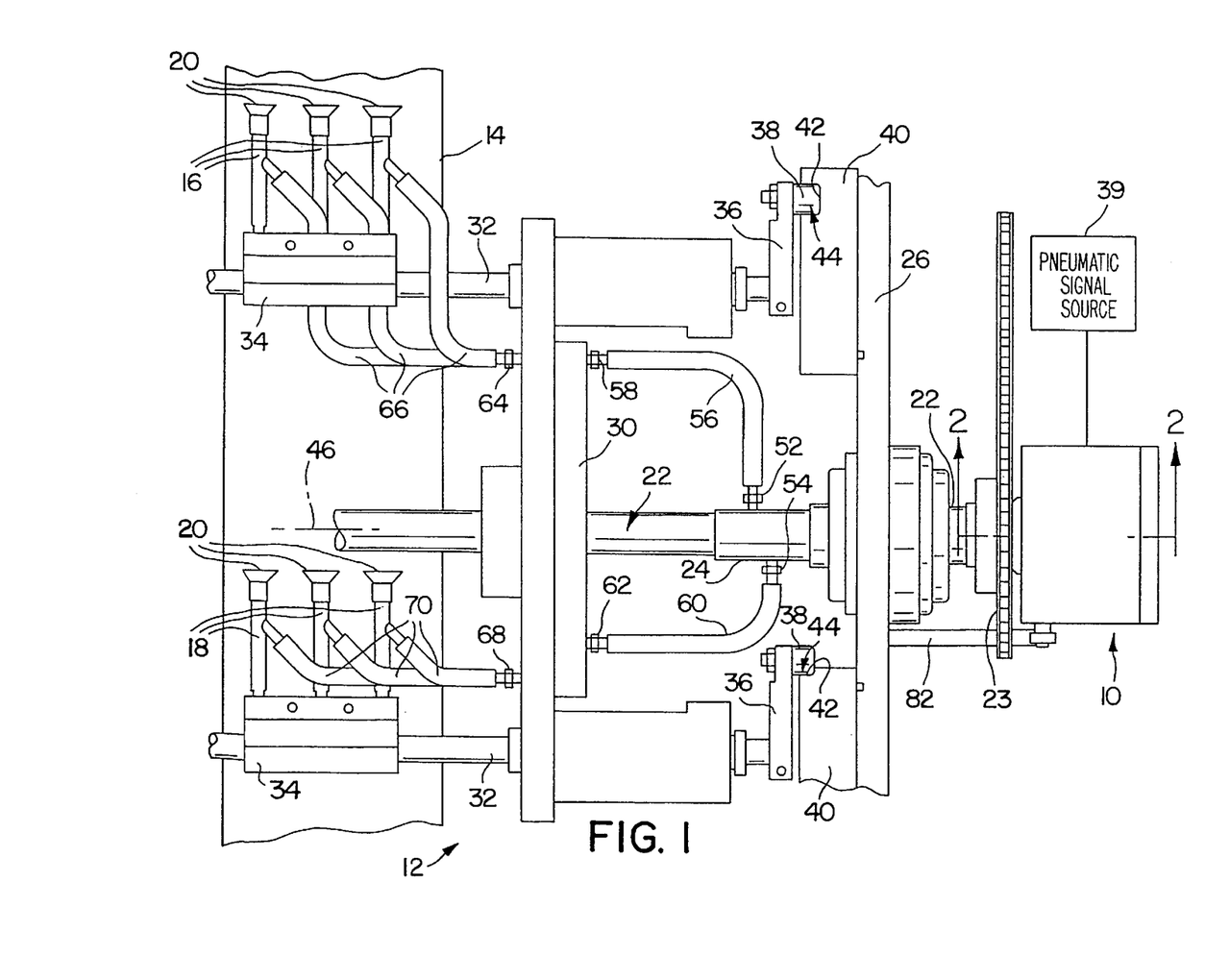
FIG. 1 is a top plan view of an article handler showing a chain driving a sprocket (not shown) attached to a shaft including a first end coupled to an article handler having suction cup lifting arms positioned above a conveyor carrying packages of processed food (not shown) and a second end received by a housing of a rotary coupling in accordance with the present invention.

A rotary coupling 10 in accordance with the present invention and illustratively shown in FIG. 1 is coupled to a rotatable article handler 12 illustratively associated with a heat seal machine (not shown). Packages (not shown) are carried by a conveyor 14 that carries the packages along a path adjacent to article handler 12. Article handler 12 includes arms 16, 18 having cups 20 that pick-up articles (not shown) from a supply stack of articles (not shown) and places the articles on the packages.

Figure 2:
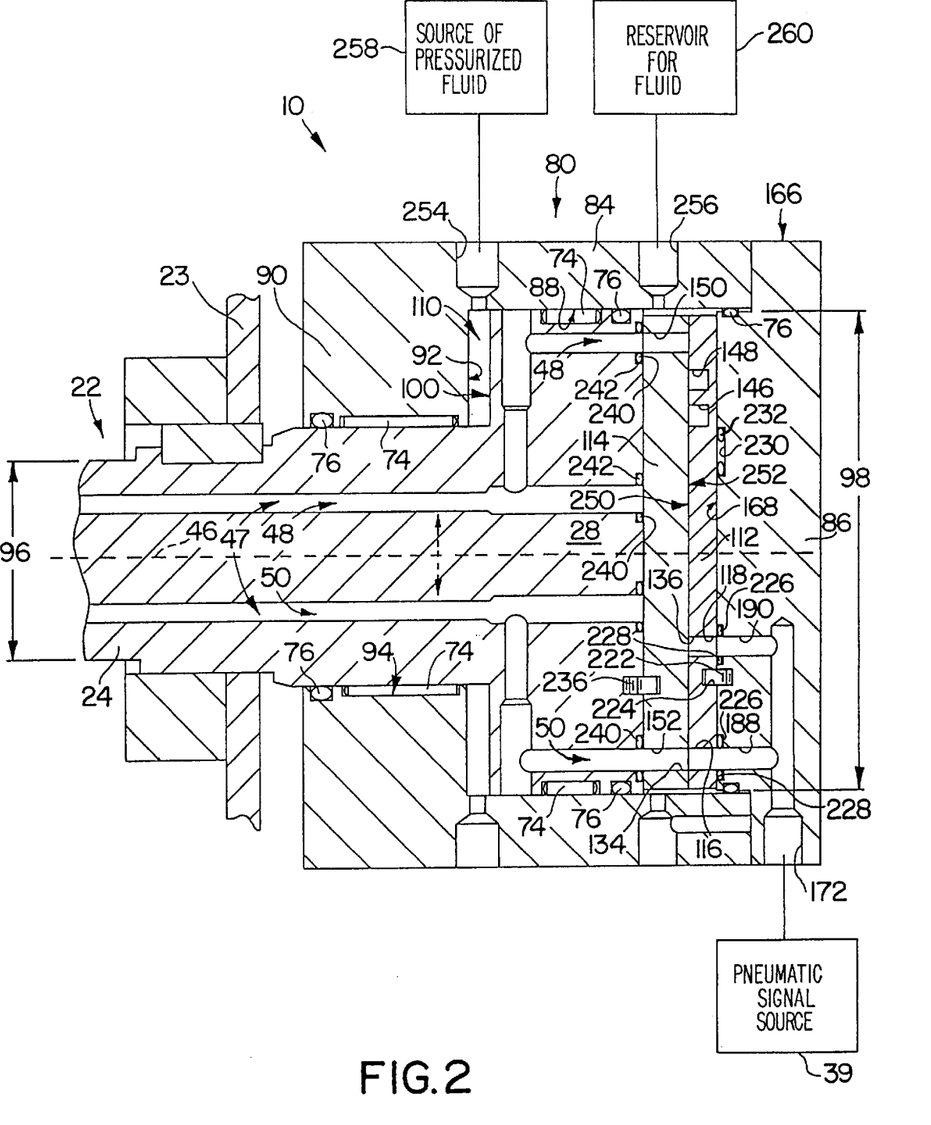
FIG. 2 is a sectional view taken along line 2—2 of FIG. 1 showing the rotary coupling including the housing, the shaft received in the housing and extending outwardly therefrom, the shaft including a widened end portion received in the housing and having openings in fluid communication with the article handler and a rotating pad radially fixed to the end portion, the housing including an end cap having openings in fluid communication with the source of pneumatic signals and a stationary pad radially fixed to the end cap, the rotating and stationary pads having openings in fluid communication with the respective openings of the end portion and the end cap, the rotating pad sealingly engaging the stationary pad.

Article handler 12 includes a main shaft 22 rotated by a chain-driven sprocket 23 as shown in FIG. 1. Main shaft 22 has a first portion 24 connected to article handler 12 and extending through a wall 26 to an end portion 28 received by rotary coupling 10 as shown in FIGS. 1 and 2. First portion 24 of main shaft 22 is keyed to a bar 30 carrying handler shafts 32. Handler shafts 32 are rotatably coupled to bar 30 and extend therethrough for rotation relative to bar 30. Blocks 34 carrying arms 16, 18 are keyed to handler shafts 32 for rotation with handler shafts 32 relative to bar 30. Each handler shaft 32 is additionally keyed to rotate with a guide arm 36 carrying a rotatable roller 38.

An annular plate 40 is fixed to wall 26 as shown in FIG. 1. Plate 40 is formed to include a channel 42 defining a roller guide path 44. As main shaft 22 rotates about an axis of rotation 46, bar 30 rotates causing handler shafts 32 to orbit about axis 46. As handler shafts 32 orbit about axis 46, rollers 38 follow roller guide path 44. Roller guide path 44 guides rollers 38 from side to side relative to handler shafts 32, thereby causing handler shafts 32 and blocks 34 carrying arms 16, 18 to rotate from side to side mimicking the motion of guide arms 36 and rollers 38 as rollers 38 trace along roller guide path 44. Thus, as main shaft 22 rotates, handler shafts 32 and arms 16, 18 orbit main shaft 22 and arms 16, 18 move from side to side relative to handler shafts 32 along a path parallel to path 44 defined by channel 42 of plate 40.

Main shaft 22 is formed to include axially-extending conduits 47 including conduits 48, 50 as shown in FIG. 2. Conduits 48, 50 are in fluid communication with nipples 52, 54 fixed to main shaft 22 shown in FIG. 1. Nipple 52 is in fluid communication through a tube 56 with a nipple 58 fixed to bar 30 and nipple 54 is in fluid communication through a tube 60 with a nipple 62 fixed to bar 30. Further, nipple 58 is in fluid communication with arms 16 through tubes 66, through a nipple 64 fixed to bar 30, and through a cavity (not shown) formed in bar 30. Also, nipple 62 is in fluid communication with arms 18 through tubes 70, through a nipple 68 fixed to bar 30, and through a second cavity (not shown) formed in bar 30, so that conduit 48 of main shaft 22 is in fluid communication with arms 16 and conduit 50 of main shaft 22 is in fluid communication with arms 18.

During each rotational cycle of article handler 12, arms 16, 18 move as the result of the rotation of main shaft 22 and the movement of rollers 38 to complete article handling movements that are coordinated with the communication of pneumatic signals between a pneumatic signal source 39 and the article handler 12. The handling movements and pneumatic signals coordinated therewith as described below for arms 16 are similar to those relating to arms 18.

Cups 20 of arms 16 move to engage the top article (not shown) in a stack (not shown) of articles as conduit 48 of main shaft 22 rotates into fluid communication with a vacuum source (not shown) of pneumatic signal source 39. Vacuum is communicated from the vacuum source through conduit 48, nipple 52, tube 56, nipple 58, nipple 64, and tubes 66 to arms 16 and cups 20 so that the vacuum holds the top article against cups 20. Continued rotation of main shaft 22 moves arms 16 and the top article carried thereon from the supply stack to a position holding the article over a package.

As the article moves over the package, conduit 48 rotates to a position blocking the fluid communication between arms 16 and the vacuum source. Conduit 48 then rotates into fluid communication with a pressurized air source (not shown) of pneumatic signal source 39. The pressurized air is communicated to cups 20 so that the article is blown free from cups 20 and is placed onto the package upon which heat sealing operations can be performed. Rotary coupling 10 operates to couple rotating article handler 12 through rotating main shaft 22 to the source of pneumatic signals 39, for example to the vacuum source and to the source of pressurized air, and to "program" the delivery of the pneumatic signals to article handler 12.

Rotary coupling 10 includes a housing 80 that is radially fixed relative to wall 26 by a turnbuckle 82 as shown in FIG. 1 and that is axially movable relative to main shaft 22. Housing 80 includes a cylindrical side wall 84 and an end cap 86 cooperating with side wall 84 to define a cavity 88 as shown in FIGS. 2 and 3.

Cylindrical side wall 84 is formed to include a radially inwardly extending step 90 having an inwardly-facing step surface 92 opposing end cap 86. End portion 28 of main shaft 22 is received in cavity 88 and main shaft 22 extends outwardly therefrom through an opening 94 defined by step 90. Bearings 74 are interposed between first portion 24 of main shaft 22 and housing 80 and between end portion 28 and housing 80 as shown in FIG. 2. O-rings 76 are likewise interposed between first portion 24 of main shaft 22 and housing 80 and between end portion 28 and housing 80 as shown in FIGS. 2 and 3.

Figure 3:
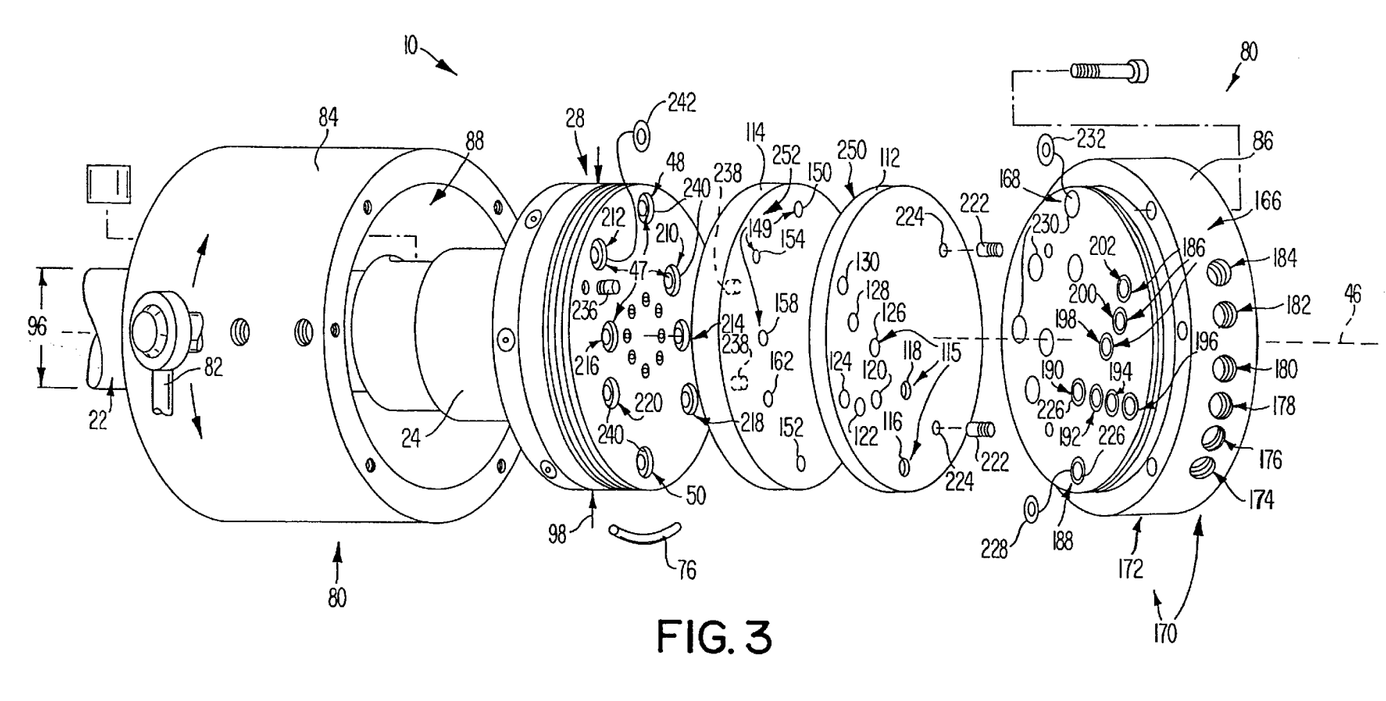
FIG. 3 is an exploded perspective view of the rotary coupling of FIG. 1 showing the housing, a turnbuckle connected to the housing to fix the housing circumferentially relative to a wall (not shown), the shaft extending through the housing, the widened end portion of the shaft being formed to include a plurality of openings, the rotating pad being rotatably fixed to the end portion and having openings extending therethrough, the openings of the rotating pad aligning with openings in the end portion, the stationary pad of the housing sealingly engaging the rotating pad and having openings therethrough, and the end cap of the housing having a conduit network formed therein, the conduit network including openings aligning with the openings in the stationary pad.

First portion 24 of main shaft 22 has a first diameter 96 and end portion 28 has a second diameter 98 that is greater than first diameter 96 as shown in FIGS. 2 and 3. A loading surface 100 connects end portion 28 to first portion 24 and cooperates with cylindrical side wall 84, step surface 92, and first portion 24 of main shaft 22 to define an annular loading chamber 110 that is a portion of cavity 88 as shown in FIG. 2.

Figure 4:
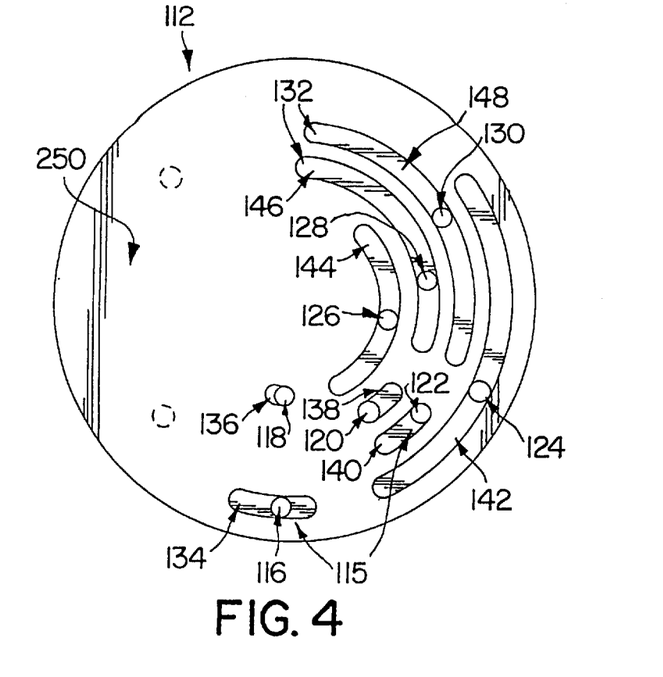
FIG. 4 is an elevation view of a first sealing face formed on the stationary pad showing channels formed in the face and openings extending through the stationary pad, the openings being in fluid communication with the channels and being configured to align with openings (not shown) formed on the end cap (not shown) so that the channels are in fluid communication with the openings in the end cap.

Rotary coupling 10 further includes a stationary pad 112 and a rotating pad 114 received by cavity 88 as shown in FIGS. 2 and 3. Stationary pad 112 engages end cap 86 and is formed to include stationary pad openings 115 including openings 116, 118, 120, 122, 124, 126, 128, 130 extending therethrough as shown in FIGS. 2 and 4. In preferred embodiments, stationary pad 112 is also formed to include channel system 132 including channels 134, 136, 138, 140, 142, 144, 146, 148 adjacent to and in fluid communication with openings 116, 118, 120, 122, 124, 126, 128, 130 respectively as shown in FIG. 4. In preferred embodiments, the channels of channel system 132 are circumferentially extending channels formed in one surface of stationary pad 112.

Figure 5:
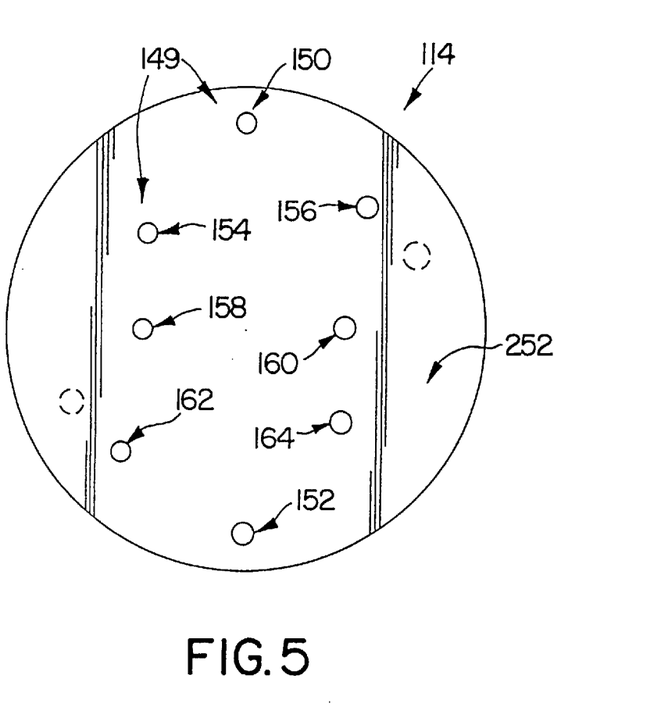
FIG. 5 is an elevation view of a second sealing face formed on the rotating pad that sealingly engages the first sealing face (not shown) showing openings extending through the pad and configured to align with openings (not shown) formed in the shaft (not shown) so that the openings in the rotating pad are in fluid communication with the openings in the shaft.

Rotating pad 114 is sandwiched between end portion 28 of main shaft 22 and stationary pad 112 and is formed to include rotating pad openings 149 including openings 150, 152, 154, 156, 158, 160, 162, 164 extending therethrough as shown in FIGS. 3 and 5. Openings 150, 152, 154, 156, 158, 160, 162, 164 are in fluid communication with axially extending conduits 47 of main shaft 22 including openings 48, 50, 210, 212, 214, 216, 218, 220, respectively, as shown in FIGS. 2 and 3. As described above, in preferred embodiments stationary pad 112 is formed to include channel system 132. However, rotating pad 114 can be formed to include channel system 132, or both rotating pad 114 and stationary pad 112 can be formed to include portions of channel system 132 without exceeding the scope of the invention as presently perceived.

In presently preferred embodiments, end cap 86 is formed to include a cylindrical side 166 and an inner surface 168 inside of cavity 88 as shown in FIG. 3. End cap 86 is further formed to include a conduit network 170 having radially extending conduits 172, 174, 176, 178, 180, 182, 184 that extend radially inwardly relative to axis 46 from cylindrical side 166 of end cap 86 as shown best in FIG. 3. Conduit network 170 further includes axially extending conduits 186, including conduits 188, 190, 192, 194, 196, 198, 200, 202 that extend axially outwardly from surface 168.

Illustratively, axially extending conduits 188, 190 are in fluid communication with radially extending conduit 172 and axially extending conduits 192, 194, 196, 198, 200, 202 are in fluid communication with radially extending conduits 174, 176, 178, 180, 182, 184 respectively as shown in FIG. 3. Radially extending conduits 172, 174, 176 are in fluid communication with a source of pressurized air (not shown) of pneumatic signal source 39 and radially extending conduits 178, 180, 182, 184 are in fluid communication with a source of vacuum (not shown) of pneumatic signal source 39 so that axially extending conduits 188, 190, 192, 194 are in fluid communication with a source of pressurized air and axially extending conduits 196, 198, 200, 202 are in fluid communication with a vacuum source. Although the presently preferred and illustrative embodiment includes the above-described conduit system 168, any system of conduits having a configuration bringing at least one conduit on surface 168 into fluid communication with a source of pneumatic signals 39 is within the scope of the invention as presently perceived.

Stationary pad 112 is rotatably fixed to end cap 86 and is axially moveable with respect thereto. Pins 222 are threadably received by end cap 86 and are slidably received by recesses 224 formed in stationary pad 112 as shown in FIGS. 2 and 3 to prevent rotation of stationary pad 112 relative to end cap 86. End cap 86 is further formed to include grooves 226 for receiving o-rings 228 adjacent to axially extending conduits 186 as well as grooves 230 for receiving o-rings 232. O-rings 228 sealingly engage stationary pad 112 and end cap 86 adjacent to conduits 186 of end cap 86 and stationary pad openings 115 as shown, for example, in FIG. 2. O-rings 232 are "dummy" o-rings provided to cushion stationary pad 112 against end cap 86 on the portion of stationary pad 112 away from openings 115 and conduits 186. O-rings 228 and o-rings 232 also cooperate to yieldably bias stationary pad 112 away from end cap 86.

Likewise, rotating pad 114 is rotatably fixed to end portion 28 of main shaft 22 and is axially moveable with respect thereto. Pins 236 are threadably received by end portion 28 and are slidably received by recesses 238 formed in rotating pad 114 as shown in FIGS. 2 and 3 to prevent rotation of rotating pad 114 relative to end portion 28. End portion 28 is further formed to include grooves 240 for receiving o-rings 242 adjacent to axially extending conduits 47 of end portion 28. O-rings 242 sealingly engage rotating pad 114 and end portion 28 adjacent to conduits 47 of end portion 28 and rotating pad openings 149 as shown, for example, in FIG. 2. O-rings 242 additionally operate to yieldably bias rotating pad 114 away from end portion 28.

Stationary pad 112 includes a first sealing face 250 and rotating pad includes a second sealing face 252 engaging first sealing face 250 as shown in FIGS. 2–5. The first and second sealing faces 250, 252 are both planar and smooth to permit the sealing engagement of the first and second sealing faces 250, 252. Preparation of the sealing faces 250, 252 can include, for example, finely machining the faces 250, 252, grinding the faces 250, 252 flat, and then lapping the faces 250, 252. By achieving planar and smooth faces 250, 252, a seal can be formed therebetween when faces 250, 252 are in engagement.

In addition, stationary pad 112 and rotating pad 114 "float" in cavity 88 between O-rings 228, 232 and o-rings 242 as shown best in FIG. 2. This float is achieved by supporting pads 112, 114 between resilient o-rings 228, 232, 242 thus allowing pads 112, 114 to make slight axial adjustments relative to end cap 86 and end portion 28 of main shaft 22 to compensate for slight tolerance inconsistencies such as, for example, misalignments of main shaft 22 relative to housing 80, and to ensure that first and second sealing faces 250, 252 mate against one another and are sealingly engaged.

Housing 80 can further be provided with a loading port 254 in fluid communication with loading chamber 110 of cavity 88 and a return port 256 in fluid communication with a portion of cavity 88 outside of loading chamber 110 as shown in FIG. 2. Loading port 254 is additionally in fluid communication with a source of pressurized fluid 258 and return port 256 is additionally in fluid communication with a reservoir 260 holding fluid at atmospheric pressure. As a result, the pressurized fluid in loading chamber 110 yieldably biases loading surface 100 away from step surface 92 to bias the first and second sealing faces 250, 252 together.

Main shaft 22 is axially fixed relative to wall 26 but housing 80 is free to move axially relative to main shaft 22 so that pressurizing the fluid in loading chamber 110 yieldably biases step surface 92 away from loading surface 100 causing housing 80 to move toward article handler 12, thus yieldably biasing end cap 86 and stationary pad 112 against rotating pad 114 and end portion 28 of main shaft 22. Biasing first sealing face 250 of stationary pad 112 against second sealing face 252 of rotating pad 114 enhances the sealing engagement therebetween by forcing additional adjustment of the pads 112, 114 relative to O-rings 228, 232, 242, end cap 86, and end portion 28 and by pressing the already planar sealing faces 112, 114 into a further conforming engagement.

The fluid of the source of pressurized fluid 258, loading chamber 110, and reservoir 260 can be essentially any generally inert fluid such as air or oil. Preferably, the fluid is oil or another lubricating fluid so that as some of the fluid leaks from loading chamber 110 to cavity 88 outside of loading chamber 110 it also lubricates end portion 28 and housing 80 as end portion 28 rotates relative to housing 80. In the preferred embodiment, the pressurized fluid is oil and the oil is pressurized by applying pressurized air to the oil to control the pressure of fluid 258.

Stationary pad 112 and rotating pad 114 cooperate to control the duration and frequency of pneumatic signals communicated from the pneumatic signal source 39 and article handler 12. In the presently preferred embodiment, stationary pad 112 includes stationary pad openings 115 and channel system 132 as shown best in FIG. 4. Channel system 132 and openings 115 cooperate with rotating pad openings 149 to program the timing and duration of the communication of pneumatic signals from pneumatic signal source 39 to article handler 12 as rotating pad 114 and end portion 28 of main shaft 22 rotate relative to stationary pad 112.

Channel system 132 includes four pairs of circumferentially extending elongated channels including channels 134, 142; 136, 144; 138, 146; and 140, 148. Both channels in each of the above-noted pairs of channels are radially spaced apart from axis of rotation 46 a generally equal distance. Each pair of channels includes a channel in fluid communication with a vacuum source including channels 142, 144, 146, 148, and a channel in fluid communication with a source of pressurized air including channels 134, 136, 138, 140.

Rotating pad 114 includes rotating pad openings 149 and second sealing face 252 that sealing engages first sealing face 250 as shown in FIG. 5. Rotating pad openings 149 are in fluid communication with conduits 47 of main shaft 22.

Illustratively, the following conditions arise when main shaft 22 and rotating pad 114 are in an initial orientation relative to stationary pad 112 and end cap 86 as shown in FIG. 2. Opening 152 in rotating pad 114 is coincident with channel 134 and opening 116 of stationary pad 112 to restore fluid communication between opening 152 and opening 116, thus restoring fluid communication between pneumatic signal source 39 and conduit 50 of main shaft 22. For another example, the sealing engagement between first and second sealing faces 250, 252 blocks fluid communication between opening 118 and channel 136 of stationary pad 112 and conduits 47 of main shaft 22. Also, the sealing engagement between the first and second faces 250, 252 sealingly encloses channels 146, 148 where second face 252 engages portions of first face 250 surrounding channels 146, 148. Finally, the sealing engagement between the first and second sealing faces 250, 252 blocks fluid communication between opening 150 of rotating pad 114 and channel system 132 and openings 115 of stationary pad 112, thereby blocking the fluid communication between conduit 48 and pneumatic signal source 39.

Each rotating pad opening 149 is radially aligned with a pair of channels of channel system 132 so that during rotation of rotating pad 114 each rotating pad opening 149 is alternately in fluid communication with each channel of the pair of channels. For example, rotating pad opening 150 is in a sealed position when stationary pad 112 is oriented as shown in FIGS. 2 and 4 and rotating pad 114 is in the initial orientation shown in FIGS. 2 and 5 so that conduit 48 is not in fluid communication with pneumatic signal source 39. End portion 28 and rotating pad 114 rotate so that opening 150 and conduit 48 progress from the sealed position to a position aligned with channel 142 and in fluid communication with the vacuum source through channel 142 and opening 124. Continued rotation moves opening 150 past channel 142 and between channel 142 and channel 134, the sealing engagement between sealing faces 250, 252 blocking fluid communication between opening 150 and channels 142, 134. Still further rotation brings opening 150 into fluid communication with the pressurized air source through channel 134 and opening 116, followed by rotation to yet another sealed position between channel 134 and channel 142 eventually moving opening 150 back to the initial orientation shown in FIGS. 2 and 5. This cycle is repeated for each revolution of rotating pad 114 relative to stationary pad 112.

Similar cycles are completed for the other seven rotating pad openings 149. For example, opening 152 and conduit 50 are in fluid communication with the pressurized air source through channel 134 and opening 116 when rotating pad 114 is in the initial position shown in FIGS. 2 and 5. As rotating pad 114 rotates, opening 152 moves to a sealed position having the edge of opening 152 engaging sealing face 250 to block the fluid communication between openings 152 and channel system 132. Opening 152 is then moved to fluid communication with the vacuum source through channel 142 and opening 124, to another sealed position having the edge of opening 152 engaging sealing face 250, and back to fluid communication with channel 134 as rotating pad 114 completes a full revolution or cycle. For yet another example, opening 154 is in fluid communication with the vacuum source through channel 146 and opening 128 in the initial position. As rotating pad 114 rotates through a complete revolution or cycle, opening 154 moves to a sealed position, to fluid communication with the pressurized air source through channel 138 and opening 120, to another sealed position, and to fluid communication with channel 146.

In the illustrative and preferred embodiment of rotary coupling 10, pairs of rotating pad openings 149 are radially aligned with each pair of channels, the openings of each pair of openings being spaced-apart by 180 degrees (180°). For example, openings 150, 152 are radially aligned with channels 142, 134 as shown in FIGS. 2, 4, and 5; openings 154, 164 are radially aligned with channels 146, 138; openings 158, 160 are radially aligned with channels 144, 136; and openings 162, 156 are radially aligned with channels 148, 140. This allows pneumatic signals from each pair of channels to alternately communicate with two sets of arms 16, 18 through two openings 149 of rotating pad 114 and two conduits 47 of main shaft 22.

As described above, stationary pad 112 contains the "programming" that controls the duration and frequency of the communication of pneumatic signals between pneumatic signal source 39 and article handler 12. As can be seen, the programming is encoded through the configuration of channel system 132 and stationary pad openings 115 relative to rotating pad openings 149. It should be clear, however, that the program can be encoded on rotating pad 114 by forming channel system 132 on rotating pad 114 or on both pads 112, 114 by forming portions of channel system 132 on each pad 112, 114.

Additionally, the programming can be changed in the preferred embodiment by replacing stationary pad 112 with a new stationary pad having a different program encoded. For example, by plugging stationary pad openings 116, 118, 120, 122, the fluid communication of rotating pad openings 149 with the source of pressurized air can be eliminated. For another example, by extending the length of channels 142, 144, 146, 148, the duration of the fluid communication between rotating pad openings 149 and the vacuum source can be extended. For yet another example, by shifting the circumferential location of channels 134, 136, 138, 140, the timing of the start and finish of the fluid communication of rotating pad openings 149 with the pressurized air source can be adjusted relative to the orientation of main shaft 22. Thus, the program controlling the fluid communication between article handler 12 and pneumatic signal source 39 can be changed by replacing stationary pad 112 with a new stationary pad having any changes of the type described above or similar thereto, or a combination of changes made on any or all of the stationary pad openings or the channels of the new stationary pad.

Also as described above, stationary pad 112 and end cap 86 are circumferentially fixed relative to wall 26 and article handler 12 by turnbuckle 82 as shown in FIG. 3. However, turnbuckle 82 can be lengthened or shortened to adjust the circumferential orientation of housing 80, end cap 86, and stationary pad 112 relative to article handler 12. This circumferential adjustment of housing 80, end cap 86, and stationary pad 112 will operate to advance or retard the timing of the communication of the pneumatic signals to article handler 12 similar to the effect of providing a new stationary pad in which the orientation of the channel system is adjusted. This adjustment may be useful for "fine tuning" the timing of the supply of pneumatic signals to article handler 12 during operation of article handler 12.

During operation of article handler 12, the movement of arms 16, 18 is dictated by the shape of channel 42 of annular plate 40 as described above with respect to FIG. 1. As main shaft 22 rotates, arm shafts 32 carrying arms 16, 18 orbit main shaft 22 and move in accordance with the movement of rollers 38 following channel 42. The path followed by arms 16, 18 is similar to the path followed by rollers 38.

As main shaft 22 rotates, end portion 28 and rotating pad 114 rotate relative to end cap 86 and stationary pad 112 so that conduits 47 formed in main shaft 22 selectively communicate pneumatic signals between pneumatic signal source 39 and article handler 12 as described above. The program encoded as the result of the configuration of channel system 132, stationary pad openings 115, and rotating pad openings 149 cooperates with article handler 12 so that rotating pad openings 149 are in fluid communication with the vacuum source (not shown) of pneumatic signal source 39 through channel system 132 and stationary pad openings 115 when cups 20 of arms 16, 18 are to hold the articles (not shown) being handled.

As main shaft 22 continues to rotate, arms 16, 18 move the articles (not shown) toward a desired placement position. When the article reaches the desired placement position, the encoded program has the rotating pad openings 115 in fluid communication with the pressurized air source (not shown) of pneumatic signal source 39 through channel system 132 and stationary pad openings 115 so that the article is released and properly placed. Adjusting turnbuckle 82 to adjust the circumferential orientation of housing 80, end cap 86, and stationary pad 112 operates to adjust the position of arms 16, 18 at which the fluid communication between article handler 12 and pneumatic signal source 39 is restored and blocked.

In the presently preferred and illustrative embodiment, eight conduits 47 are formed in main shaft 22 allowing for the communication of pneumatic signals to eight individually programmed sets of arms 16, 18. In the preferred embodiment, pairs of rotating pad openings 149 are staggered to match the pattern of channels in stationary pad 112 so that two sets of arms 16, 18 receive the same pneumatic signal generally simultaneously.

For example, rotating pad openings 150, 156 are generally simultaneously brought into fluid communication with the vacuum source through channels 142, 148, respectively, when rotating pad 114 is at a selected angular orientation. Afterward, rotating pad openings 150, 156 are brought into fluid communication with the source of pressurized air through channels 134, 140, respectively, at another selected angular orientation. Likewise, each opening of the pairs of rotating pad openings 160, 164; 152, 162; and 154, 158 are generally simultaneously brought into fluid communication with pairs of channels 144, 146 followed by 136, 138; 142, 148 followed by 150, 156; and 152, 162, followed by 154, 158, respectively, so that pairs of sets of arms 16, 18 receive the same pneumatic signal generally simultaneously.

In addition, in the presently preferred rotating pad 114, staggered pairs of rotating pad openings 149 are spaced apart from other staggered pairs of rotating pad openings 149 by 180 degrees (180°), thus maximizing the spacing between the pairs of openings. For example, openings 150, 156, are 180 degrees (180°) spaced-apart from openings 152, 162. Likewise, openings 154, 158 are 180 degrees (180°) spaced-apart from openings 164, 160. This spacing maximizes the flexibility afforded to the configuration of channel system 132 while also allowing arms 16, 18 associated with each pair of openings 149 to be 180 degrees (180°) out of phase during their movement.

Rotary coupling 10 in accordance with the present invention is useful for article handling applications in which it is desirable to pass pneumatic flow through a rotary joint from a stationary side to a rotating side of the rotary joint. Particularly, rotary coupling 10 is useful for article handling applications in which the timing of the pneumatic flow needs to be controlled. As described above, rotary coupling 10 is capable of communicating pneumatic flow through multiple channels and conduits, of restricting the communication of the pneumatic flow so that the pneumatic flow is available only at selected portions of the cycle, and of "2-way" communication for communicating both vacuum and forced air signals. Additionally, rotary coupling 10 allows for easy adjustment of the flow timing through adjustment of the rotational orientation of housing 80, while being able to self-adjust axially for manufacturing tolerance variability or other variations.

Although the invention has been described in detail with reference to the preferred embodiment, additional variations and modifications exist within the scope and spirit of the invention as described and defined in the following claims.

We claim:

1. A rotary coupling for selectively blocking and unblocking fluid communication between a rotating apparatus and a stationary source of pneumatic signals as the rotating apparatus rotates relative to the stationary source, the rotary coupling comprising a housing having a cylindrical side wall and first and second end walls, the second end wall being formed to include a shaft-receiving opening and the first end wall having a first face cooperating with the cylindrical side wall and the second end wall to define a cavity, and an end portion of a shaft rotatable received in the cavity, the end portion having a second face sealingly engaging the first face and an annular surface generally parallel to the first and second faces and spaced apart from both of the second face of the end portion and the second end wall of the housing to define a loading chamber of the cavity therebetween so that the second face is yieldably biased against the first face when pressurized fluid is received in the loading chamber wherein the pressurized fluid received in the loading chamber is oil and the oil includes an exposed surface away from the loading chamber and in fluid communication with the oil in the loading chamber and the oil is pressurized by applying pressurized air to the exposed surface of the oil.

2. The rotary coupling of claim 1, wherein the housing is axially movable relative to the axis of rotation of the end portion and the housing moves axially relative to the end portion when the pressurized fluid is received in the loading chamber to yieldably bias the first face toward the second face.

* * * * *

UNITED STATES PATENT AND TRADEMARK OFFICE
CERTIFICATE OF CORRECTION

PATENT NO. : 5,971,020
DATED : October 26, 1999
INVENTOR(S) : Glen R. Raque, et. al.

It is certified that error appears in the above-identified patent and that said Letters Patent is hereby corrected as shown below:

Title page, under [56],

The following references as cited to the U.S. Patent Office are included in the References Cited section:

| | | |
|---|---|---|
| 4,991,375 | 1991 | Raque et al. |
| 5,096,052 | 1992 | Raque et al. |
| 5,345,747 | 1994 | Raque et al. |

Signed and Sealed this

Fifth Day of December, 2000

Attest:

*Attesting Officer*

Q. TODD DICKINSON
*Director of Patents and Trademarks*